Patented Dec. 18, 1945

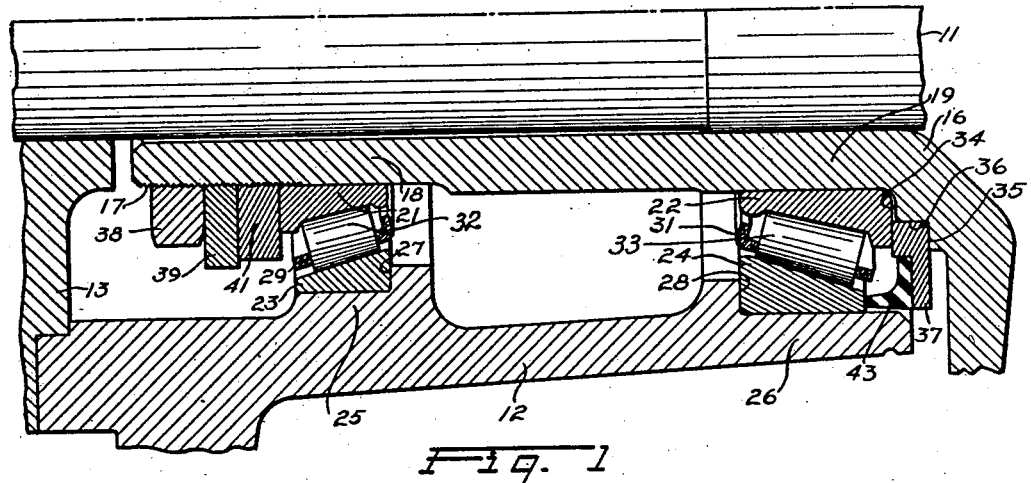

2,391,007

UNITED STATES PATENT OFFICE 2,391,007

RESILIENT LUBRICANT SEAL

Lawrence R. Buckendale, Detroit, Mich., assignor to The Timken-Detroit Axle Company, Detroit, Mich., a corporation of Ohio Application June 12, 1944, Serial No. 539,819

3 Claims. (Cl. 286—7)

This invention relates to means for effecting a fluidtight seal between relatively moving parts, more particularly between a rotating wheel hub and an axle spindle or housing on a power driven vehicle.

This application is a continuation-in-part of my co-pending application Serial No. 433,512 filed March 5, 1942, now forfeited.

In power driven vehicles the wheels are supported on their axles by means of lubricated bearings and means are ordinarily provided to prevent the leakage of bearing and other lubricant, such as from the differential, from leaking past the journal mountings between the wheels and the axle and onto the brake drums and tires as well as to prevent the entrance of mud, water and abrasive dust from without into the bearings. Many such seals have been tried with different degrees of success. Many have been of complicated and expensive construction involving the use of such components as metal finger springs to compress them in sealing engagement against the rotating parts with which they cooperate. Some embody annular rubber seals which rely only upon their inherent resiliency for exerting sufficient sealing pressure, while others are provided with sponge material or the like between the sealing material and the supporting member to urge the sealing material into engagement with the sealing surface. Bearing seals embodying finger springs or their equivalents, in axial compression, have been found unsatisfactory as the initial pressure of the seal against the sealing surface must be so great that the seal is worn rapidly necessitating frequent replacement.

A frequent cause of failure in previous seals has been that the torque occasioned by friction between the sealing surfaces causes the seal device to wind up and shorten thus relieving to some extent the sealing pressure. This has been found to be especially true in seals in which a sponge rubber material or the like is utilized to exert the sealing pressure since, when the unit pressure between the sealing surfaces is sufficient to form a satisfactory seal, the initial troquing movement of the rotating part tends to distort the sponge material. Even though the effectiveness of the sponge material may not be permanently affected immediately, the winding up shortens the effective length of the seal thus relieving the pressure and causing leakage.

In order to maintain an effective seal over an extended period of service the device must have sufficient resistance to rotation and shear to avoid distortion and must also resist radial movements to avoid rounding off of the sealing surface. At the same time, they must have a sufficient flexibility in a axial direction to maintain a substantially uniform pressure at the sealing surface and substantially the same pressure uniformly around the sealing surface.

With these and related considerations in view, it is an object of this invention to provide a seal of resilient material substantially cylindrical in form having a sealing edge that presents to its mating sealing surface a narrow band or contact having sharp inner and outer edges and in which the pressure between the contact surfaces causes deflection but does not effect the distribution of pressure on said inner and outer edges and in which torque due to friction between the mating surfaces will not materially affect distribution of pressure between the sealing surfaces.

Another object of my invention resides in the provision of a new combination of bearing and sealing means of simple construction wherein a homogeneous body of resilient material is secured to a metallic support which is rigidly supported relative to a spacing element.

A further important object of my invention resides in the provision of a new combination of a bearing and sealing means wherein the sealing means is adjusted by adjustment of the bearing.

A still further object of my invention resides in the provision of bearing means for a pair of relatively movable elements, in combination with a sealing means clamped between one of the elements of the bearing means and a radial surface of the other element.

A further object of my invention resides in the provision of an improved resilient bearing seal tapering from a narrow radial sealing face or lip abutting a sealing surface to relatively broad radial surface supported by a rigid backing ring.

Another object of my invention is the provision of a homogeneous synthetic rubber ring having a thin-walled, substantially cylindrical portion, one end of which is bonded to a metallic ring support, and the other end of which provides a radial fluid sealing face of low friction coefficient when pressed against the radial face of a relatively rotating element and slightly lubricated.

A further object of the invention is to provide a novel liquid seal comprising an annular member of homogeneous resilient material formed on one radial side with a continuous flat narrow annular sealing face and having on its other side a rigid flat backing substantially in a plane parallel to the sealing face. Pursuant to this object, opposite edges of the face are made relatively sharp.

The foregoing, and other ancillary objects, will become apparent from the following detailed description of preferred embodiments of my invention, when considered with the appended claims and accompanying drawing, wherein:

Figure 1 is a section through a fragmentary portion of an automotive wheel hub and axle housing, showing one embodiment of the invention, with the seal, bearings, hub and housing in assembled relationship;

Figure 2 is an enlarged sectional view of the seal shown in Figure 1;

Figure 3 is a diagrammatic sectional view of the seal of Figure 2 illustrating the symmetrical distortion caused by axial pressure wherein the pressure distribution remains substantially the same on both the inner and outer sharp edges of the sealing face;

Figure 4 is a partial sectional view, similar to Figure 1, showing another embodiment of a sealing device constructed in accordance with the invention, wherein the resilient sealing material is supported in a sheet metal ring and bears against a special steel sealing ring; and Figure 5 is a fragmentary sectional view, similar to Figure 1, but shows a further embodiment of the invention wherein the resilient seal bears against the radial flange of a flanged sheet metal bearing race retaining ring.

The seal of my invention may be employed between two relatively rotating parts and is not limited to application as a lubricant seal, although the latter will be described as the preferred embodiment of the invention. This particular seal comprising the preferred embodiment of the invention about to be described in detail was especially designed for preventing leakage of lubricant between relatively rotating parts of a vehicle wheel and axle assembly, but it will be understood that it is equally applicable for sealing off leakage of lubricant between any two relatively rotating parts wherein the same problems are presented.

If only pure relative rotation existed between the wheel and the axle, lubrication leakage could be effectively stopped simply by providing accurately machined parallel radial surfaces located as close as possible to each other on adjacent portions of the axle and wheel, and there would be no lubricant leakage through the very small space therebetween.

In a construction where a wheel is journalled on an axle, in spite of the fact that the tolerances during manufacture are held within very small limits as demanded by the commercial situation or as permitted by methods of assembly and construction, undesired relative movements between the axle and the wheel hub, in addition to the pure rotation desired, are unavoidably encountered.

Three major undesired relative movements of this nature arise because of (1) eccentricity of the axle relative to the wheel, which may arise for example from radial play in the assembly or deflections under load; (2) misalignment of the wheel and the axle, such as may be due to inaccuracies in manufacture; and (3) axial play between the wheel and the axle, due to tolerances and/or wear. It will be appreciated that the relative movements of wheel and axle arising from these three unavoidable conditions will cause impairment of any seal which is incapable of following them. Hence, it is necessary to provide a sealing device which will compensate for all of these movements, or any of them individually, and adapt itself to changing conditions.

Axial play and misalignment of the axle and the wheel both result in relative axial movements of the wheel and axle during normal operation, which means that the seal must possess the characteristic of being deformable axially to withstand these relative movements. It must not only be deformable but it must be resilient so that it can follow these movements as they occur and thus maintain the seal at all times.

Compensation for misalignment between the wheel and axle also requires that the seal be capable of flexing radially with respect to the axis of the axle while at the same time maintaining a sealing engagement between the axle and the wheel.

Compensation for eccentricity, which arises when relative displacements of the wheel and axle take place, requires that the seal be sufficiently rigid so that it will not buckle and collapse when this displacement takes place, and also so that it be sufficiently radially flexible that when this displacement takes place there will be no such shift of the region of engagement between the seal and the cooperating relatively rotatable surface as will alter its sealing characteristics.

According to my invention, I have provided a seal which is simple and inexpensive to manufacture, and which has all of the characteristics necessary to satisfy the above requirements to provide a seal which is efficient under the normal conditions encountered in axle shaft bearing assembly operating conditions.

I have discovered that the above requirements are satisfied when the seal comprises an annular member of resilient material having a relatively narrow flat sealing face on one side and a rigid flat backing in a plane parallel to the sealing face at the side opposite the sealing face. By this construction I insure that the forces arising from misalignment, end play, eccentricity and the like are maintained generally axially of the seal and substantially perpendicular to the planes of the sealing face and rigid backing face, and the sealing face is not inclined so as to wear along one edge. Preferably, the opposite edges of the sealing face are sharp and the degree of sharpness affords a definite control over the admission and retention of lubricant film between the sealing face and the cooperating relatively rotatable surface.

The unit pressure at the sealing face is kept as low as the degree of sealing required, and is not permitted to become so high as to destroy the lubricant film for the sealing face or create damaging friction.

Specifically, in the particular embodiment of the invention to be described and which has proven commercially practical, the seal of my invention comprises an annular member of a homogeneous resilient material, preferably an oil resistant synthetic rubber compound such as "neoprene" or the like, having a full annular backing of rigid material, such as an annular steel member vulcanized or otherwise secured thereto. This rigid annular member is secured to one of the relatively rotating parts, in this case the wheel. In the preferred embodiment of the invention, the resilient member comprises a thickened body portion and an integral axially projecting flange portion which is of smaller cross-section than the body so that it is flexible radially of the axle, and this flange is formed at its outer end with a narrow flat annular sealing face of uniform width adapted to slidingly engage a corresponding machined flat smooth radial surface on the other relatively rotating part of the assembly. In the illustrated embodiment, this machined surface is a radial face on the bearing assembly.

I have discovered that by making the resilient body and the reduced flange integral and of a homogeneous resilient material and by fully rigidly backing the body opposite the flange in a plane parallel to the sealing face, a construction is provided wherein the flange acts as a flexible arm during axial misalignment between the wheel and the axle and flexes between the backed body portion and the narrow sealing face in such fashion that the sealing face does not alter its condition of engagement with the associated relatively rotatable sealing surface, the effective seal remaining as if there had been no misalignment between the wheel and axle.

This construction insures that the deformation forces arising in the seal during the above-mentioned unavoidable normal operating conditions are maintained substantially axially of the seal and substantially normal to the plane of the backing face.

In practice, I have found it best to provide an axially tapered construction for this flexible flange.

When the axle assembly is made up, the seal is placed under axial compression to insure that it provides sufficient sealing pressure to prevent leakage of lubricant. This sealing pressure may vary during operation due to misalignment or axial play between the wheel and the axle. The axial resiliency of the seal, particularly that of the flange, must be such that it absorbs or otherwise compensates for these variations in sealing pressure and continuously maintains the sealing face against its associated sealing surface with sufficient pressure to maintain the sealing engagement. At the same time, the flange must be sufficiently rigid that it will not buckle or collapse under normal sealing pressures.

I have discovered that when the seal is made of a homogeneous body of resilient material having an integral flange of the type contemplated in the invention there is a minimum tendency for the seal to wind up and thereby shorten its axial length and destroy its sealing pressure during operation. This is a distinct advantage of the present construction which contributes greatly to its efficiency and practical usefulness.

The flexible flange absorbs eccentricity and relative radial displacements of the shaft and the wheel and insures that there is no shifting or radial displacement of the sealing face relative to its associated relatively rotatable sealing surface.

The width of the sealing face which engages the corresponding sealing surface on the relatively rotating part of the assembly is selected at a minimum because a perfectly planar surface perpendicular to the axis of the axle shaft may be obtained much more readily where the sealing face is narrow than where it is wider. On the other hand, the sealing face must be much wider than a mere knife edge so as to prevent axial collapse of the flange and it must be of sufficient extent to maintain a lubricating film adequate to prevent the seal from being frictionally worn during normal operation.

I have found it advantageous in this respect to insure that the opposite edges of the sealing face are as sharp as possible. The purpose of this construction will be appreciated when it is observed that it provides a maximum sealing area for the axial cross-section presented, and provides a lubricant film space of uniform thickness.

When resilient seals of this nature are initially installed, they are usually preliminarily lubricated at the sealing face to provide an initial film of lubricant between the relatively rotating parts in order to prevent seizure or burn out of the seal during initial rotation. This lubricant film must be maintained in order to preserve this condition. I have discovered that the construction contemplated by the invention maintains sufficient sealing pressure to maintain this uniform thin film of lubricant between the flat sealing face and the machined surface which it engages, but at the same time it prevents any of the lubricant from moving appreciably radially of the seal. I attribute this latter in great measure to the provision of sharp opposite edges of the sealing face, because I have discovered that if one of these sealing face edges should be rounded or otherwise deformed so that a space wider than the requisite film may be presented at the sealing face edge, a pumping action is initiated which forces lubricant radially of the seal and comprises a definite leak of lubricant. By providing these sharp edges on opposite edges of the sealing face, I prevent such pumping action from taking place while at the same time maintaining the axial sealing pressure within such limits as will enable me to retain a lubricant film at the sealing face.

Similarly, I may provide for control of the admission of lubricant for such film by variations in sharpness of these sealing face edges, a factor which is mainly dependent on the relative rotational speeds of the parts to which the seal is applied.

From the above, it will be seen that the invention contemplates a flexibly mounted sealing face which maintains its predetermined condition of engagement with the relatively rotatable machined surface with which it is associated during all conditions of normal operation, and wherein all relative movements other than pure rotation between the axle shaft and wheel are absorbed and compensated for by the flexible and resilient action of the seal flange between the sealing face and the seal body. The large mass of resilient material provided in the resilient body of the preferred embodiment of the invention provides a reservoir for storing the energy required for maintaining uniform axial compression, and for distributing and absorbing the angular forces set up upon flexure of the flange.

A commercial adaptation of the preferred embodiment of the invention will now be described. Referring to the drawing in detail and particularly to Figure 1, 11 is a driving axle for a wheel (not shown) which is attached to a hub 12. A flange 13 is attached to axle 11 by means such as a key and nut (not shown). Flange 13 is provided with a shouldered recess which forms a corresponding internal seat for a shoulder on the hub. The flange 13 may be suitably attached to the hub 12 as by stud bolts (not shown) passing through the flange and threaded in the hub.

The axle 11 rotates within a tapered cylindrical spindle or housing 16 having an exteriorly threaded portion 17 and bearing race supporting portions 18 and 19. A pair of roller bearings, having inner races 21 and 22, are seated on the portions 18 and 19, respectively, of the housing. The outer races 23 and 24 of the bearings are seated in internal cylindrical portions 25 and 26 and bear against internal shoulders 27 and 28 of the hub 12. Spacers 29 and 31 properly space the rollers 32 and 33 within their respective races.

The housing 16 is provided with a pair of axially spaced radial shoulders 34 and 35 connected by a cylindrical portion 36. A ring 37, having an axial thickness slightly greater than the length of cylindrical portion 36 of the housing, fits over that cylindrical portion and seats against the radial shoulder 35. This ring is part of my novel oil seal assembly, as will presently appear. Because of the axial thickness of the inner portion of the ring 37 the inner bearing race 22 abuts ring 37 instead of radial shoulder 34 of the housing, and ring 37 functions as a thrust washer or collar as well as a seal support.

The hub and bearings are held in assembled relationship on the housing by means of a nut 38 threaded onto the threaded portion 17 of the housing. Lock washers 39 and 41 are located between the nut 38 and the inner bearing race 21. By tightening nut 38 the bearings and hub are clamped between the nut and the radial portion 35 of the housing in well known manner. Tightening nut 38 also, through the bearings and hub, clamps ring 37 between the inner bearing race 22 and radial portion 35 of the spindle. The ring 37 is chamfered at 42, as more clearly shown in Figure 2, so that it will seat properly on portions 35 and 36 of the housing, even when foreign matter is present in the corner.

The novel seal of the invention is supported and backed by ring 37 and is urged axially into engagement with a radial face of the outer bearing race 24 with a pressure sufficient to effect an efficient seal, and yet not sufficiently high to cause the sealing element to be "grooved" or worn excessively through rubbing engagement with the race. The seal material also is so compounded as to have a fairly low coefficient of friction when lubricated and to have sufficient stability to retain its shape in use.

Resilient member 43 comprises a cylindrical annulus having a narrow flat annular sealing face 46 on one side and a parallel flat face 45 on the opposite side backed by the corresponding radial surface of ring 37 which is secured thereto. At the backed side, annulus 43 is radially thickened to provide a body portion 44 secured circumferentially to ring 37 and providing a large bonding area with ring 37 at face 45. The flexible portion of member 43 extending axially from body 44 is designated as a flange indicated at 49.

As shown in Figures 1 and 2, annular cup-shaped homogeneous resilient member 43 is seated in a recessed portion of ring 37, the recessed portion forming cylindrical and radial supports for the resilient member. Circumferential support for the body of resilient member 43 is not necessary, but full axial backing such as is provided at 45 is an important feature of the invention. The resilient member preferably is made of oil resistant synthetic rubber such as "neoprene" having a durometer hardness of approximately 80 to 90. Resilient member 43 is preferably permanently bonded to ring 37 as by vulcanizing, after being moulded in place on the support ring.

Member 43 is of a length axially such as to be slightly deformed when in assembled and sealing relationship. In the embodiment shown in Figure 1, the generally cylindrical axial extent of resilient member 43 is approximately one-half inch, and it is normally deformed about twenty-five thousandths of an inch in an axial direction when assembled on the axle. Flange 49 of resilient member 43 is comparatively thin and terminates in narrow annular flat radial sealing face 46 (approximately 5/64 inch wide in the commercial embodiment) which has sealing engagement with the radial sealing face of the outer bearing race 24. Sealing face 46, which constitutes a sealing surface, is parallel to face 45 and is disposed parallel with the associated radial face of race 24 when the two are brought into engagement so that the sealing pressure will be evenly and uniformly distributed over the entire area of contact.

As illustrated, flange 49 of the resilient member 43 is preferably tapered and of continuously decreasing cross-section outwardly of the backed base portion of member 43. Annular sealing face 46 is relatively narrow and its opposite edges 50 and 52 are sharp and continuous for reasons above explained.

Due to the resiliency and construction of the synthetic rubber member 43, the narrow radial sealing face 46 exerts only a relatively light pressure against the rotary bearing race so that grooving or scoring of the rubbing faces is prevented. The flexibility of the synthetic rubber element also permits it to operate under eccentric or off-center conditions without affecting its efficiency, and at the same time it has sufficient internal stability to retain its shape, even after long periods of service.

By means of my construction the leakage of oil from the bearings is effectively prevented, and the metallic ring having the resilient element bonded or otherwise secured thereto provides a simple combined seal and bearing thrust washer having an extremely long life. Also, by reason of the novel combination of the seal with the bearing, it is possible to equip many bearing assemblies with the novel seal of the invention by merely clamping it against one bearing race and allowing it to sealingly engage the other race, using spacing washers if necessary to bring about a proper relative axial position of the parts.

After extended use it is usual for a slight play to develop in the bearings of the assembly. There is simultaneously some wear of the face of the resilient element so that its pressure against the bearing race is slightly reduced. The present invention makes it possible to simultaneously compensate for wear of the bearings and of the seal. This is accomplished simultaneously by removing the flange 13 from the hub and then tightening the nut 38 on the threaded portion 17 of the housing. Such tightening will remove any looseness in the assembly and simultaneously move the hub 12 slightly toward the seal, so that a slight compression of the resilient element is effected, usually restoring the original sealing pressure.

Figure 3 is substantially the same as Figure 2 except that ring 37 is only partially shown and the shape of the resilient element and the position of the sharp edges 50 and 52 of narrow sealing face 46 in two stages of axial deformation of flange 49 is indicated in solid and broken lines to illustrate the symmetrical distortion of the seal as when axially deformed during the above described bearing adjustment, which inhibits any change in the distribution of pressure on the sealing face 46 or on either edge 50 or 52 thereof.

Thus, as the seal is axially deformed, flange 49 becomes uniformly slightly thicker and sealing face 46 becomes only slightly wider while retaining its flat uniform pressure engagement with the radial end surface of race 24. The uniformly tapered cross-section of flange 49 insures against bending or non-uniform collapse of the seal.

The length of elongated flange 49 is chosen to obtain as much flexibility as spatial considerations permit within the assembly. The width of sealing face 46 is always narrow during operation to keep the sealing pressures as low as practically possible.

The embodiment of the invention shown in Figure 4 differs from that of Figures 1 and 2 in that the housing 116, rather than being of integral construction, is provided with an inserted tubular sleeve 118 on which is seated the inner race 121 of a roller bearing in abutting engagement with the outer end of the housing.

The oil seal, generally indicated at 120, comprises a resilient annular member 122 and a cup-shaped annular stamped sheet steel retainer and support member 124. Support member 124 is press fitted on an annular shoulder 126 provided at the end of the housing. The resilient portion of the oil seal may be retained in support ring 124 by compression or by permanent bonding as in the case of Figures 1 and 2.

The axially directed narrow sealing face of resilient ring 122 engages the smooth face 128 of a radial metal ring 130, eliminating the possibility of abrasion of the resilient sealing face due to any imperfections in the end of the inner bearing race. Metal ring 130 is press fitted in or otherwise non-rotatably secured to hub 132 in abutting engagement against the internal shoulder 134.

Resilient ring 122 is generally similar to ring 43, being provided with an elongated axially directed annular leg 123 of substantially the same taper terminating in a flat annular narrow sealing face. Ring 122 is also preferably formed with an intermediate annular recessed part 125 permitting relatively easy flow of the resilient material when leg 123 is axially deformed.

The embodiment shown in Figure 4 has several advantages which make it preferable in certain installations. For example, it has an inexpensive stamped backing member of such configuration that the resilient material need not be bonded to it and which may be easily assembled as by press fitting onto an unmachined base.

The embodiment shown in Figure 5 is similar in every respect to that of Figure 1, except that a cup-shaped stamped sheet steel ring 47 having a radial flange 48 is press fitted into an internal cylindrical portion of the hub 12. The ring 47 has the dual function of retaining the bearing in the hub during assembly or disassembly, and of providing a smooth surface to contact the radial sealing face 46 of resilient element 43. In some instances there may be imperfections in the radial face of the outer bearing race which contacts the resilient element as in the embodiment of Figure 1. Any such imperfections will cause undue wear on the sealing face of the resilient member, which disadvantage is eliminated by the use of a separate metallic element 47 having a smooth contact face as in the embodiment of Figure 5.

My new combination of bearing thrust washer and sealing means provides a simple and effective seal of long life. By means of my construction, whereby the seal is adjusted by taking up the play in the bearing assembly itself, a simplified adjustment is provided which facilitates the maintenance of proper sealing pressure.

It will be noted that the several embodiments of this invention provide improved, yet simple and inexpensive, oil seals of resilient material which in each case present a relatively narrow, flat sealing surface to the surface with which they cooperate.

The narrow, flat sealing face minimizes friction and thus the resultant heat and wear and, with its sharp edges which prevent the passage of lubricant or water through the seal, is easier to accurately manufacture than a wider face type of seal.

Of particular importance is the nature of the resiliency of the seal of this invention. The sealing face itself has a uniform small radial dimension and lies in a plane normal to the axis of rotation of the hub. The material extending away from the sealing face has a slight taper, gradually increasing in thickness away from the sealing face until it meets the annular portion of the seal member to which it is joined by a large fillet such as at 51. The rigid backing plate such as 37 or 124 extends outwardly to the periphery of the annular resilient member and provides a rigid support for the rearward side of this member. This prevents the tapered portion of the member from flaring outwardly under pressure and maintains the sealing face of the resilient member parallel to the contact surface on the outer bearing race or other member with which it cooperates to provide a lubricant seal, even though the sealing face may be moved toward the backing plate under the sealing pressure. This eliminates any tendency to wear away or round off the sharp edges of the sealing face.

The hardness of the material and the taper of the portion of the member immediately back of the sealing face, together with the relatively large mass of material around the fillet at the rearward end of the taper portion, effectively resist any tendency of the member to wind up or shorten under the functional load on the sealing face but permit sufficient resilient movement of the sealing face to maintain the sealing pressure within desirable operative limits.

The resilient member is a homogeneous body of carefully controlled hardness and resiliency and, as mentioned above, has low friction characteristics when slightly lubricated. By using a very narrow sealing face, sufficiently high unit pressure can be maintained to provide an effective seal without the necessity of resorting to high total pressure such as would impose a drag on the rotation of the hub or result in excessive friction with consequent heating and rapid wear of the parts.

The shape of the portion of the resilient member immediately back of the narrow sealing face is also of great importance. This portion must have a high degree of flexibility perpendicular to the sealing face and a high degree of rigidity circumferentially of the sealing face. This is accomplished by making this portion of the sealing member as long as spatial limitations permit and maintaining the section of this portion relatively thin with a slight outward taper away from the sealing face so that this portion has a high resistance to annular shear but only a moderate resistance to axial compression.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid seal comprising an annular backing ring and an annular body of resilient material non-rotatably secured to said ring and extending axially therefrom, said body of resilient material comprising an annular base portion of substantial mass fully backed in a plane by said ring, and an axially deformable tapered annular portion of continuously decreasing cross-section outwardly of said base portion extending axially from said base portion and terminating in a narrow flat continuous sealing face lying in a plane parallel to the adjacent surface of said ring and having opposite sharp edges.

2. A fluid seal comprising an annular backing ring and an annular body of homogeneous resilient material non-rotatably secured to said ring and extending axially therefrom, said body of resilient material comprising an annular base portion of substantial mass fully axially backed by said ring, and an axially deformable tapered annular portion of continuously decreasing cross-section outwardly of said base portion extending axially from said base portion and terminating in a narrow flat smooth continuous sealing face lying in a plane perpendicular to the axis of said seal, said smooth sealing face having opposite sharp edges whereby substantially equal unit pressure distribution may be maintained over said entire sealing face area.

3. In the fluid seal defined in claim 2, an axially extending annular projection on said ring, said projection having its external periphery coextensively engaged with the internal periphery of said base portion of said resilient body.

LAWRENCE R. BUCKENDALE.